(12) United States Patent
Chen et al.

(10) Patent No.: US 8,195,922 B2
(45) Date of Patent: Jun. 5, 2012

(54) SYSTEM FOR DYNAMICALLY ALLOCATING PROCESSING TIME TO MULTIPLE THREADS

(75) Inventors: Hong-Yi Chen, Fremont, CA (US); Sehat Sutardja, Los Altos, CA (US)

(73) Assignee: Marvell World Trade, Ltd., St. Michael (BB)

( * ) Notice: Subject to any disclaimer, the term of this patent is extended or adjusted under 35 U.S.C. 154(b) by 992 days.

(21) Appl. No.: 11/084,364

(22) Filed: Mar. 18, 2005

(65) Prior Publication Data
US 2006/0212687 A1 Sep. 21, 2006

(51) Int. Cl.
G06F 9/30 (2006.01)
G06F 9/40 (2006.01)
G06F 15/00 (2006.01)

(52) U.S. Cl. .................. 712/205; 712/220; 712/228
(58) Field of Classification Search .............. 712/228
See application file for complete search history.

(56) References Cited

U.S. PATENT DOCUMENTS

| | | | |
|---|---|---|---|
| 5,148,546 A | 9/1992 | Blodgett | |
| 5,305,455 A * | 4/1994 | Anschuetz et al. | 718/100 |
| 5,357,617 A | 10/1994 | Davis | |
| 5,404,469 A * | 4/1995 | Chung et al. | 712/215 |
| 5,515,538 A * | 5/1996 | Kleiman | 710/260 |
| 5,659,749 A | 8/1997 | Mitchell et al. | |
| 5,805,479 A | 9/1998 | Tang | |
| 5,828,880 A | 10/1998 | Hanko | |
| 5,930,518 A | 7/1999 | Suzuki | |
| 6,011,666 A | 1/2000 | Wakamatsu | |
| 6,061,306 A | 5/2000 | Buchheim | |
| 6,088,044 A | 7/2000 | Kwok et al. | |
| 6,119,091 A | 9/2000 | Huang et al. | |
| 6,184,906 B1 | 2/2001 | Wang et al. | |
| 6,223,208 B1 | 4/2001 | Kiefer et al. | |
| 6,272,517 B1 | 8/2001 | Yue et al. | |
| 6,301,604 B1 | 10/2001 | Nojima | |
| 6,341,347 B1 | 1/2002 | Joy et al. | |
| 6,385,638 B1 | 5/2002 | Baker | |
| 6,420,903 B1 | 7/2002 | Singh et al. | |
| 6,496,692 B1 | 12/2002 | Shanahan | |
| 6,560,628 B1 | 5/2003 | Murata | |
| 6,618,812 B2 | 9/2003 | Seiler et al. | |

(Continued)

FOREIGN PATENT DOCUMENTS
EP 0943995 9/1999
(Continued)

OTHER PUBLICATIONS

Shen & Lipasti; Modern Processor Design: Fundamentals of Superscalar Processors; Jul. 22, 2002; McGraw Hill; Beta Edition; pp. 447-448.*

(Continued)

Primary Examiner — Corey S Faherty

(57) ABSTRACT

A pipeline processor architecture, processor, and methods are provided. In one implementation, a processor is provided that includes an instruction fetch unit operable to fetch instructions associated with a plurality of processor threads, a decoder responsive to the instruction fetch unit, issue logic responsive to the decoder, and a register file including a plurality of banks corresponding to the plurality of processor threads. Each bank is operable to store data associated with a corresponding processor thread. The processor can include a set of registers corresponding to each of a plurality of processor threads. Each register within a set is located either before or after a pipeline stage of the processor.

34 Claims, 7 Drawing Sheets

U.S. PATENT DOCUMENTS

| | | | |
|---|---|---|---|
| 6,658,490 | B1 | 12/2003 | Williams et al. |
| 6,826,749 | B2 | 11/2004 | Patel et al. |
| 6,981,261 | B2 | 12/2005 | Kalafatis et al. |
| 7,117,497 | B2 * | 10/2006 | Miller et al. ................... 718/102 |
| 7,137,117 | B2 | 11/2006 | Ginsberg |
| 7,302,684 | B2 | 11/2007 | Hsieh |
| 7,308,686 | B1 | 12/2007 | Fotland et al. |
| 7,430,737 | B2 | 9/2008 | Welbon et al. |
| 7,437,724 | B2 | 10/2008 | Wolrich et al. |
| 7,493,621 | B2 | 2/2009 | Bradford et al. |
| 7,657,893 | B2 | 2/2010 | Armstrong et al. |
| 7,681,199 | B2 | 3/2010 | Gootherts et al. |
| 2001/0052130 | A1 | 12/2001 | Yap et al. |
| 2002/0002667 | A1 | 1/2002 | Kelsey et al. |
| 2003/0149716 | A1 | 8/2003 | Peterson |
| 2004/0064816 | A1 | 4/2004 | Alverson et al. |
| 2004/0068643 | A1 | 4/2004 | Dowling |
| 2004/0098720 | A1 | 5/2004 | Hooper |
| 2004/0107336 | A1 | 6/2004 | Douglas et al. |
| 2004/0187120 | A1 | 9/2004 | Moore et al. |
| 2004/0215984 | A1 | 10/2004 | Kalla |
| 2004/0216113 | A1 | 10/2004 | Armstrong et al. |
| 2005/0097553 | A1 | 5/2005 | Smith et al. |
| 2005/0138628 | A1 | 6/2005 | Bradford et al. |
| 2005/0149931 | A1 | 7/2005 | Lin et al. |
| 2005/0154860 | A1 | 7/2005 | Arimilli et al. |
| 2007/0150898 | A1 | 6/2007 | Duda et al. |
| 2010/0037233 | A1 | 2/2010 | Armstrong et al. |

FOREIGN PATENT DOCUMENTS

| | | |
|---|---|---|
| EP | 0 982 732 | 3/2000 |
| EP | 0 999 549 | 5/2000 |
| EP | 1498824 | 4/2004 |
| JP | 63-014243 | 1/1988 |
| JP | 01-099132 | 4/1989 |
| JP | H2-67434 | 5/1990 |
| JP | 02-226458 | 9/1990 |
| JP | 03-188530 | 8/1991 |
| JP | 03-188531 | 8/1991 |
| JP | 09-171462 | 6/1997 |
| JP | 09-190348 | 7/1997 |
| JP | 01-306323 | 11/2001 |
| JP | 01-521215 | 11/2001 |
| JP | 2001-521215 | 11/2001 |
| JP | 02-082815 | 3/2002 |
| JP | 2003-167748 | 6/2003 |
| JP | 03-241980 | 8/2003 |
| JP | 03-523561 | 8/2004 |
| JP | 04-234123 | 8/2004 |
| JP | 05-25749 | 1/2005 |
| WO | WO 99/21081 | 4/1999 |
| WO | WO 99/21082 | 4/1999 |
| WO | WO 99/48296 | 9/1999 |
| WO | WO 01/50249 A2 | 7/2001 |
| WO | WO 03/088036 A1 | 10/2003 |
| WO | 2004095282 | 11/2004 |
| WO | WO 2005/101221 A1 | 10/2005 |

OTHER PUBLICATIONS

Mano & Kime; Logic and Computer Design Fundamentals; 2001; Prentice Hall; Second Edition Updated; pp. 119,124.*

Silberschatz & Galvin; Operating Systems Concepts; 1994; Addison-Wesley Publishing Company; Fourth Edition; pp. 147-148.*

Settles, Curtis, DSP-Augmented CPU Cores Promise Performance Boost for Ultra-Compact Drives, Data Storage, May 2000, pp. 35-38, PennWell, US.

Quantum, Part 2: A Closer Look at Hard Disk Drives; Chapter 3—Inside Hard Disk Drives, Quantum Online, Jun. 7, 2000, pp. 1-3, Quantum, US.

Quantum, Part 4: Recent Technological Developments; Chapter 4—The Impact of Leading-Edge Technology on Mass Storage, Quantum Online, Jun. 7, 2000, pp. 1-3, Quantum, US.

U.S. Appl. No. 09/659,693, filed Sep. 11, 2000, entitled "*Method and Apparatus for Recording and Reproducing Digital Data*".

U.S. Appl. No. 10/184,505, filed Jun. 26, 2002, entitled "*Apparatus, Method, and Computer Program Product for Recording and Reproducing Digital Data*".

U.S. Appl. No. 10/184,302, filed Jun. 26, 2002, entitled "*Vehicle for Recording and Reproducing Digital Data*".

U.S. Appl. No. 10/184,299, filed Jun. 26, 2002, entitled "*Integrated Circuit, Method, and Computer Program Product for Recording and Reproducing Digital Data*".

U.S. Appl. No. 10/690,022, filed Oct. 20, 2003, entitled "*Apparatus and Method for Telephone, Intercom, and Clock*".

U.S. Appl. No. 10/692,644, filed Oct. 24, 2003, entitled "*Apparatus, Method, and Computer Program for Sprinkler Control*".

U.S. Appl. No. 10/703,034, filed Nov. 5, 2003, entitled "*Apparatus, Method, and Computer Program for an Alarm System*".

U.S. Appl. No. 11/046,089, filed Jan. 8, 2005, entitled "*Method and Apparatus for Recording and Reproducing Digital Data*".

Japanese Office Action dated Sep. 19, 2006.

Haskins, J.W. et al., "Inexpensive Throughout Enhancement in Small-Scale Embedded Microprocessors with Block Multithreading: Extensions, Characterization, and Tradeoffs," *Institute of Electrical and Electronics Engineers, Conference Proceedings of the 2001 IEEE International Performance, Computing, and Communications Conference(IPCCC)*, Phoenix, AZ, Apr. 4-6, IEEE International Performance, Computing and Communications Conference, New York, NY: IEEE, US, vol. Conf. 20, Apr. 4, 1001 (Apr. 4, 2001), pp. 319-328, XP001049966, ISBN: 0-7803-7001-5.

U.S. Appl. No. 11/070,780, filed Mar. 1, 2005, entitled "Variable Length Pipeline Processor Architecture", 44 pages.

Japanese Office Action for Patent Application No. 2006-71828 dated Sep. 19, 2006 (14 pages).

Japanese Office Action, dated May 29, 2007, issued in corresponding Japan Application No. 2006-71828, pages.

Japanese Office Action for Patent Application No. 200610065528.2 dated Jul. 6, 2007, 5 pages.

US Office Action for U.S. Appl. No. 11/084,364 dated Jun. 12, 2007, 24 pages.

US Office Action for U.S. Appl. No. 11/084,364 dated Oct. 22, 2007, 22 pages.

US Office Action for U.S. Appl. No. 11/084,364 dated Apr. 11, 2008, 26 pages.

US Office Action for U.S. Appl. No. 11/084,364 dated Mar. 2, 2007, 35 pages.

Japanese Office Action for Patent Application No. 2007-242577 dated Jan. 22, 2008, 6 pages.

Japanese Office Action, dated May 20, 2008, issued in corresponding Japan Application No. 2007-242577, 4 pages.

Singapore Office Action for Patent Application No. 200601675-2 dated Mar. 28, 2008, 9 pages.

Singapore Office Action for Patent Application No. 200601676-0 dated Apr. 28, 2008, 17 pages.

Japanese Office Action dated Sep. 19, 2006, for Patent Application No. 2006-71828, 14 pages.

European Search Report, dated Sep. 23, 2008, issued in corresponding European Application No. 06005551.4, 3 pages.

European Search Report, dated Jun. 17, 2009, issued in corresponding European Application No. 06005551.4, 4 pages.

Japanese Office Action, dated Aug. 11, 2009, issued in corresponding Japan Application No. 2006-71828, 12 pages.

Chinese Office Action, dated Nov. 23, 2007, issued in corresponding China Application No. 200610065331.9, 8 pages.

Japanese Office Action, dated Apr. 27, 2010, issued in corresponding Japan Application No. 2007-242577, 10 pages.

Japanese Office Action, dated Jan. 20, 2009, issued in corresponding Japan Application No. 2006-072084, 29 pages.

Japanese Office Action, dated May 19, 2009, issued in corresponding Japan Application No. 2006-072084, 19 pages.

Singapore Office Action, dated Mar. 28, 2008, issued in corresponding Singapore Application No. 200601675-2, 8 pages.

Singapore Office Action, Bartvai, E., Authorized Officer, Austrian Patent Office, Singapore Application No. 200601676-0, in 2nd Examination Report mailed Oct. 20, 2010, 4 pages.

Singapore Office Action, dated Jan. 21, 2009, issued in corresponding Singapore Application Serial No. 200601676-0, 5 pages.

Taiwanese Office Action, dated Mar. 25, 2009, issued in corresponding Taiwan Application No. 95108580, 5 pages.

Taiwanese Office Action, dated Sep. 23, 2009, issued in corresponding Taiwan Application No. 95108580, 14 pages.

U.S. Patent Office, U.S. Appl. No. 11/084,386, filed Mar. 18, 2005, in Office Action dated Mar. 21, 2011, 24 pages.

US Office Action for U.S. Appl. No. 11/084,386 dated Feb. 1, 2012, 32 pages.

* cited by examiner

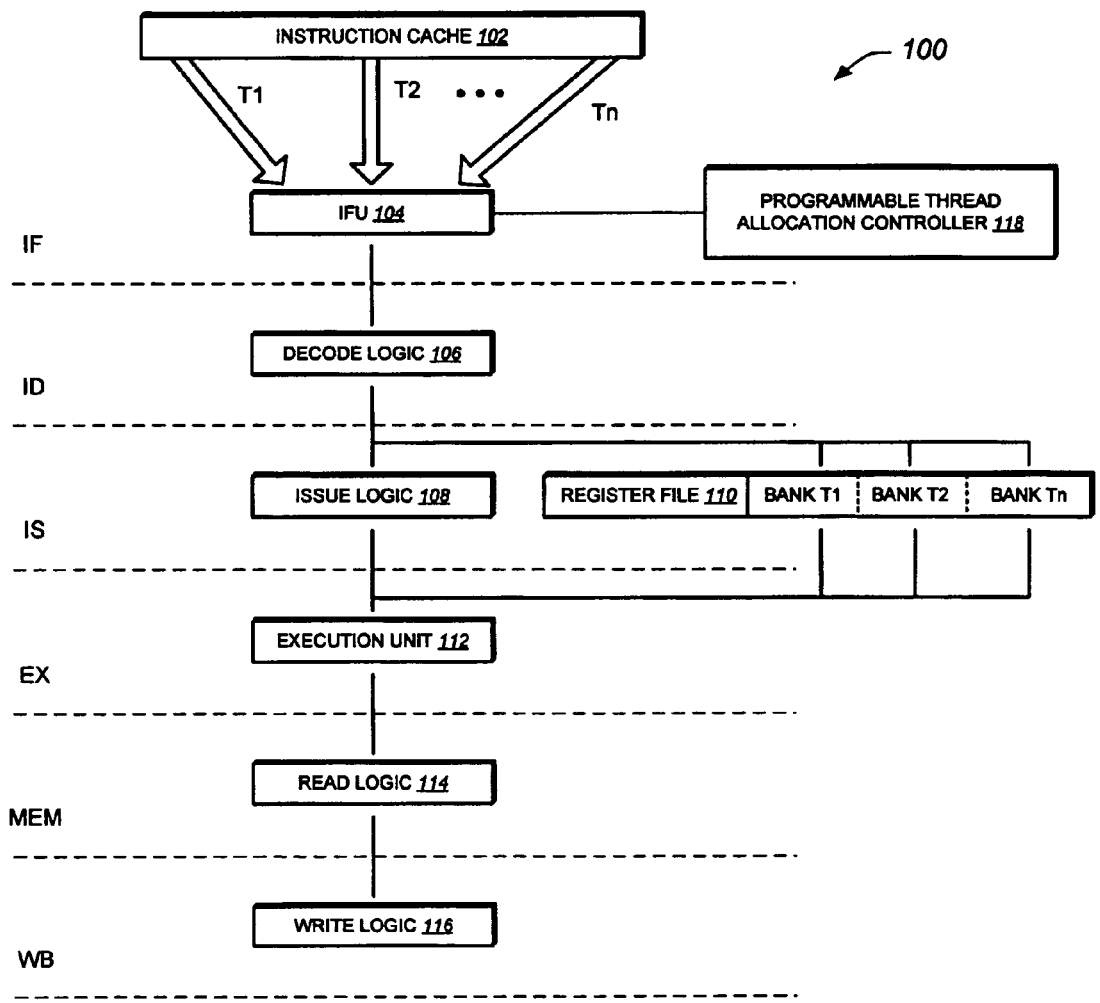
FIG._1

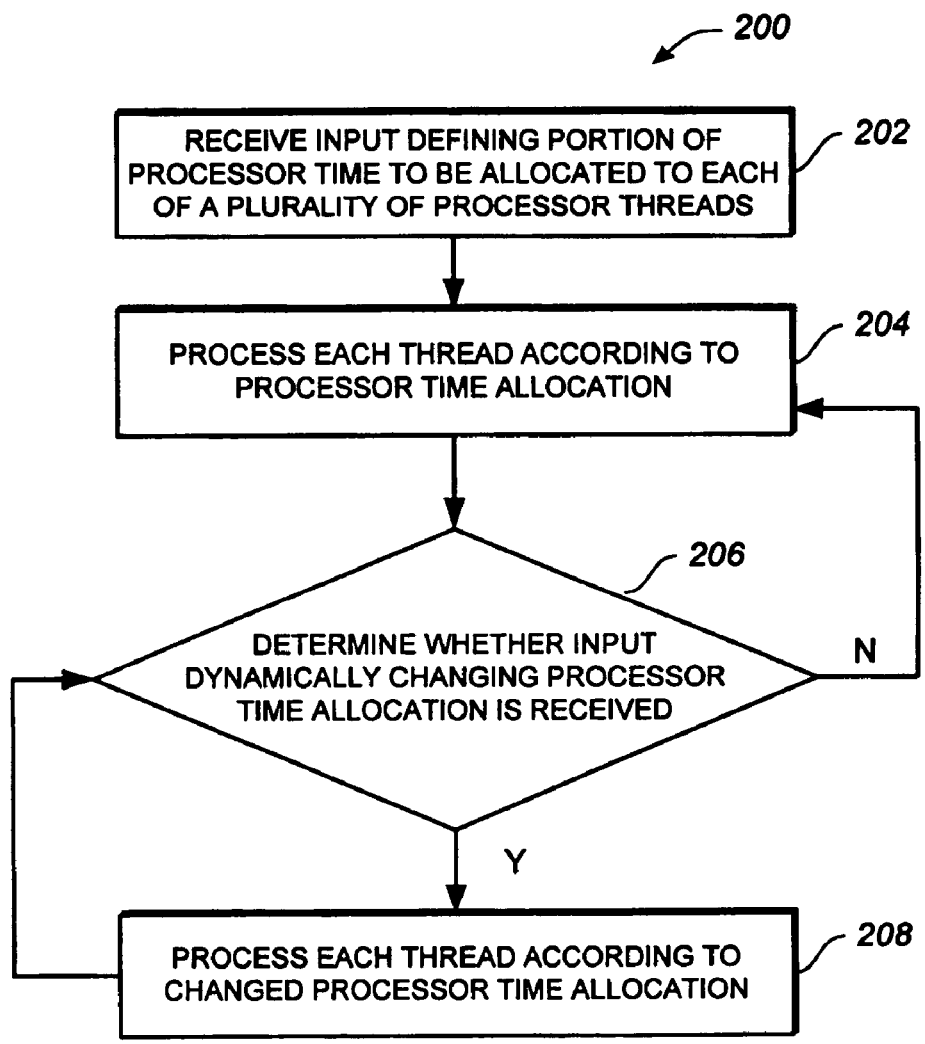
FIG._2

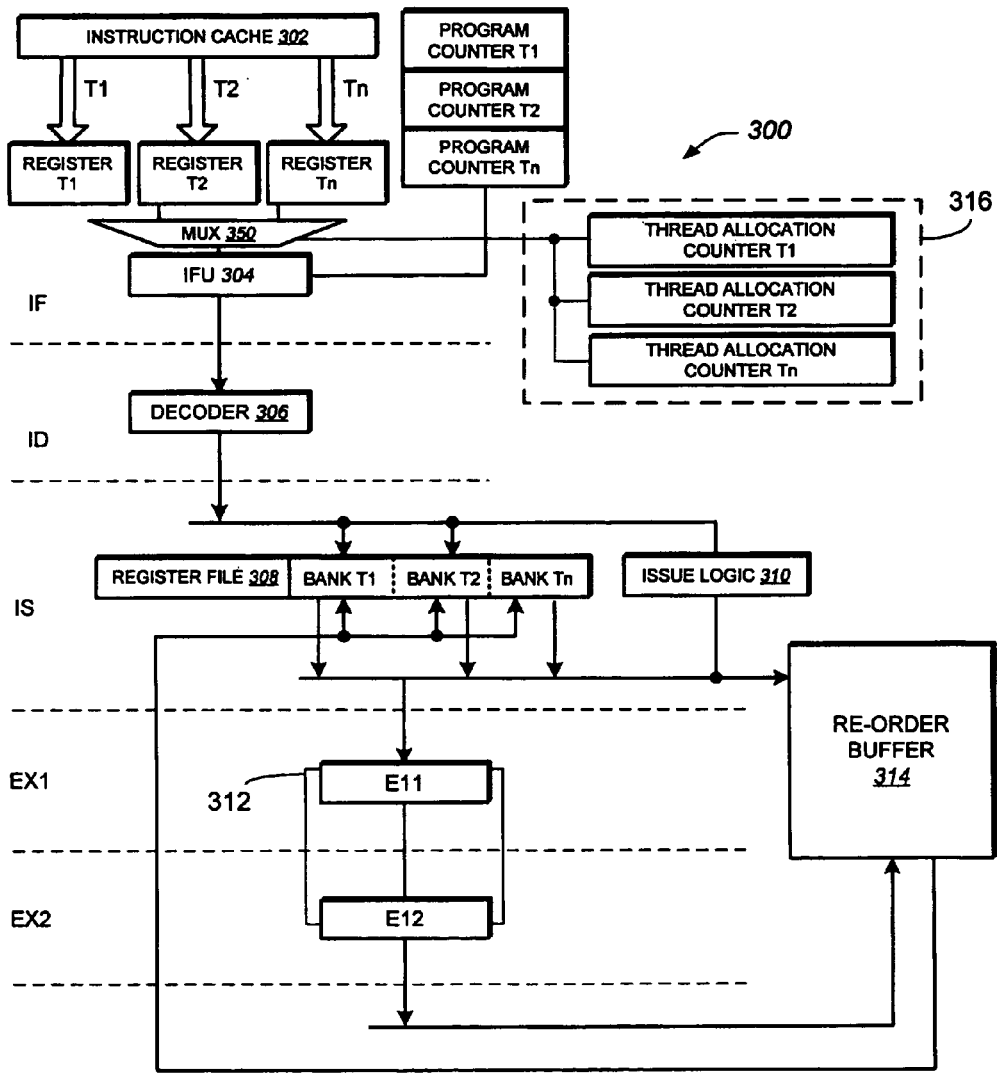
FIG._3

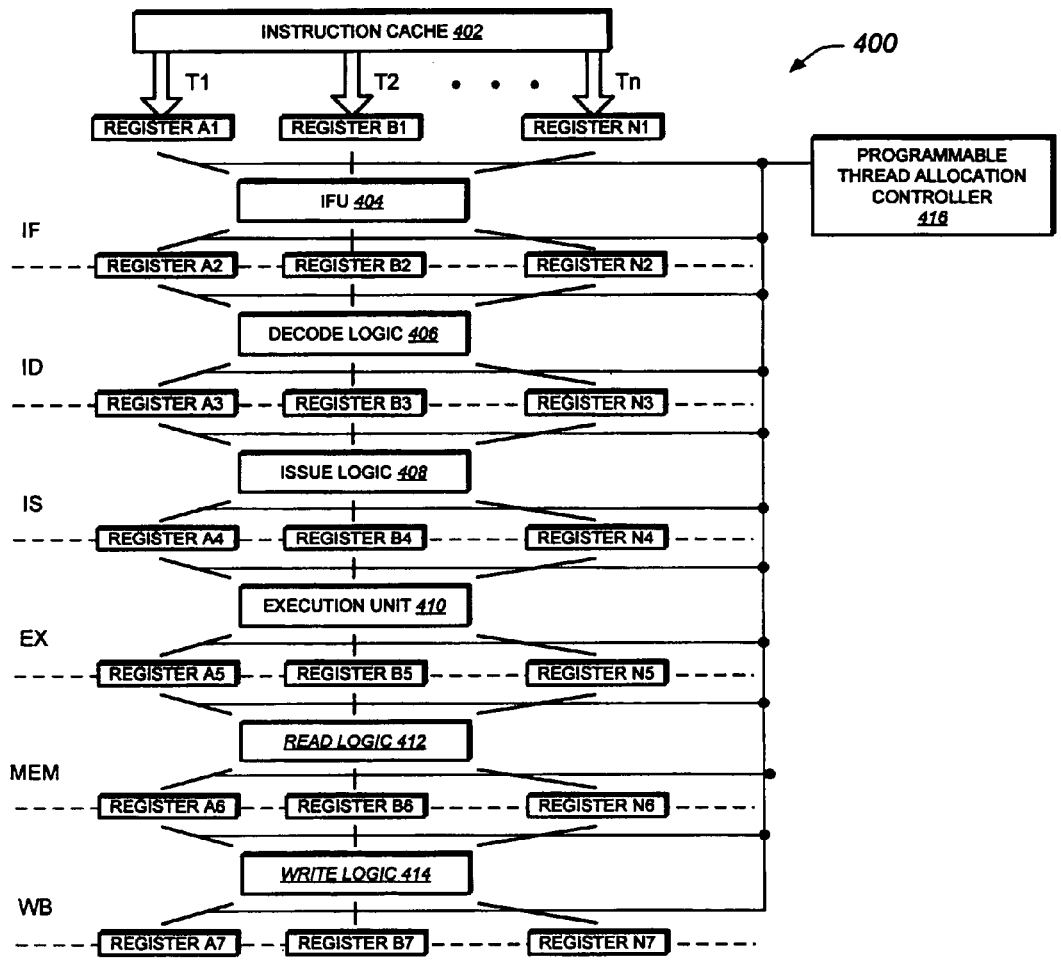
FIG._4

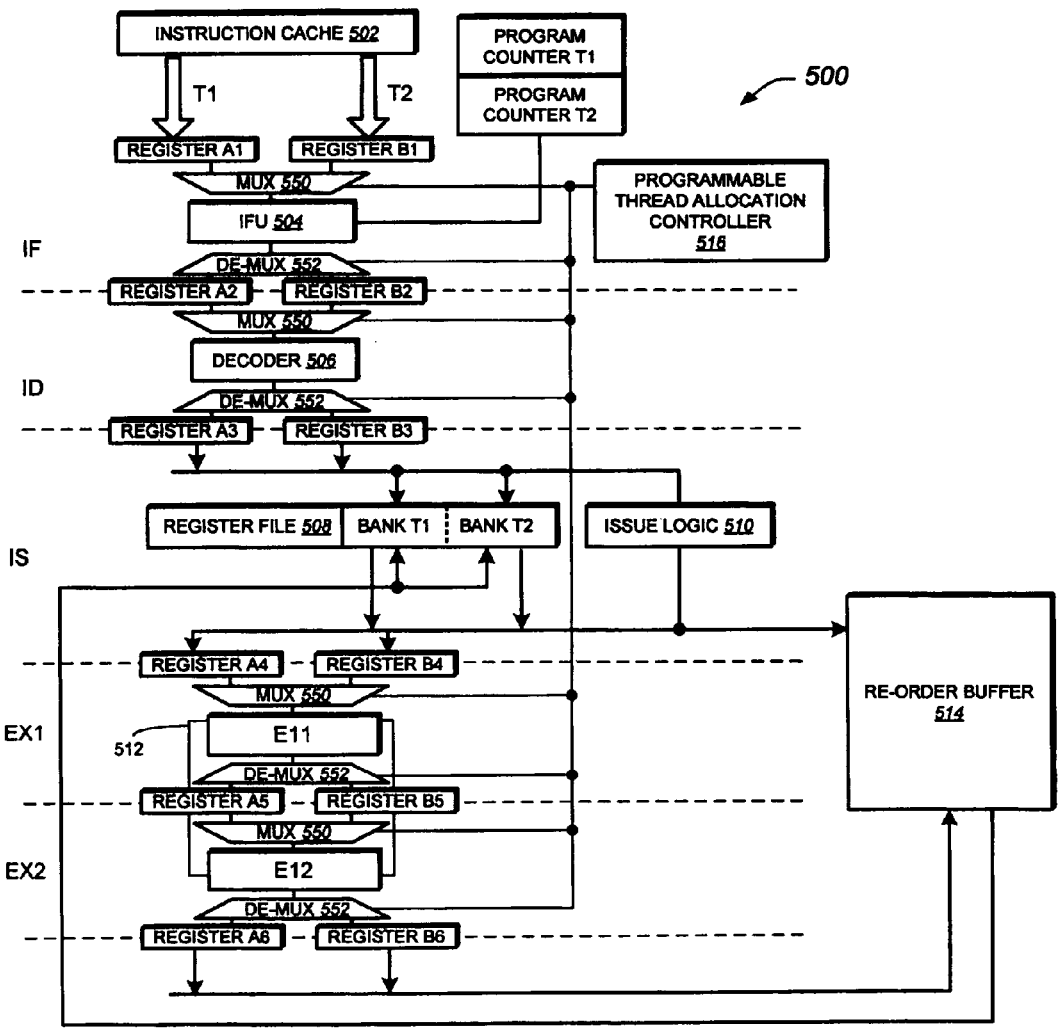
FIG._5

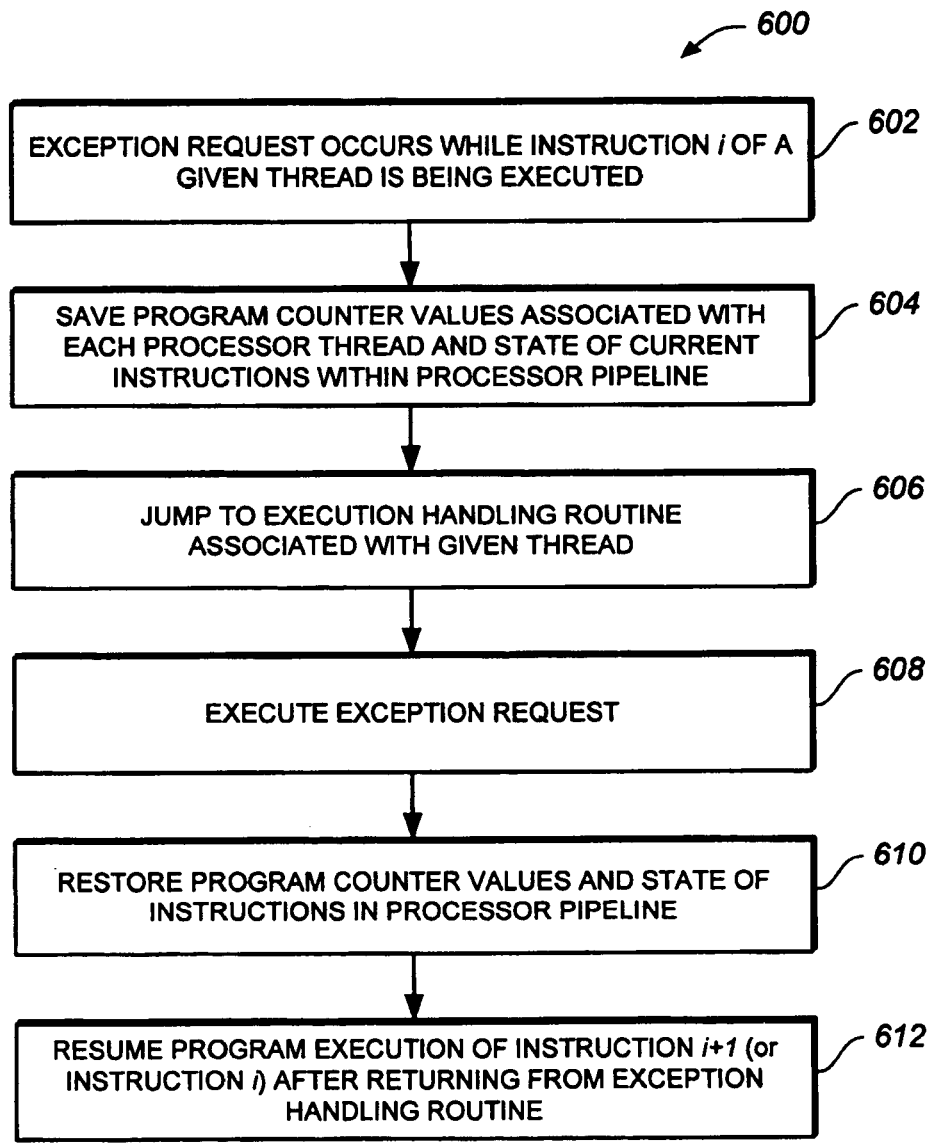
FIG._6

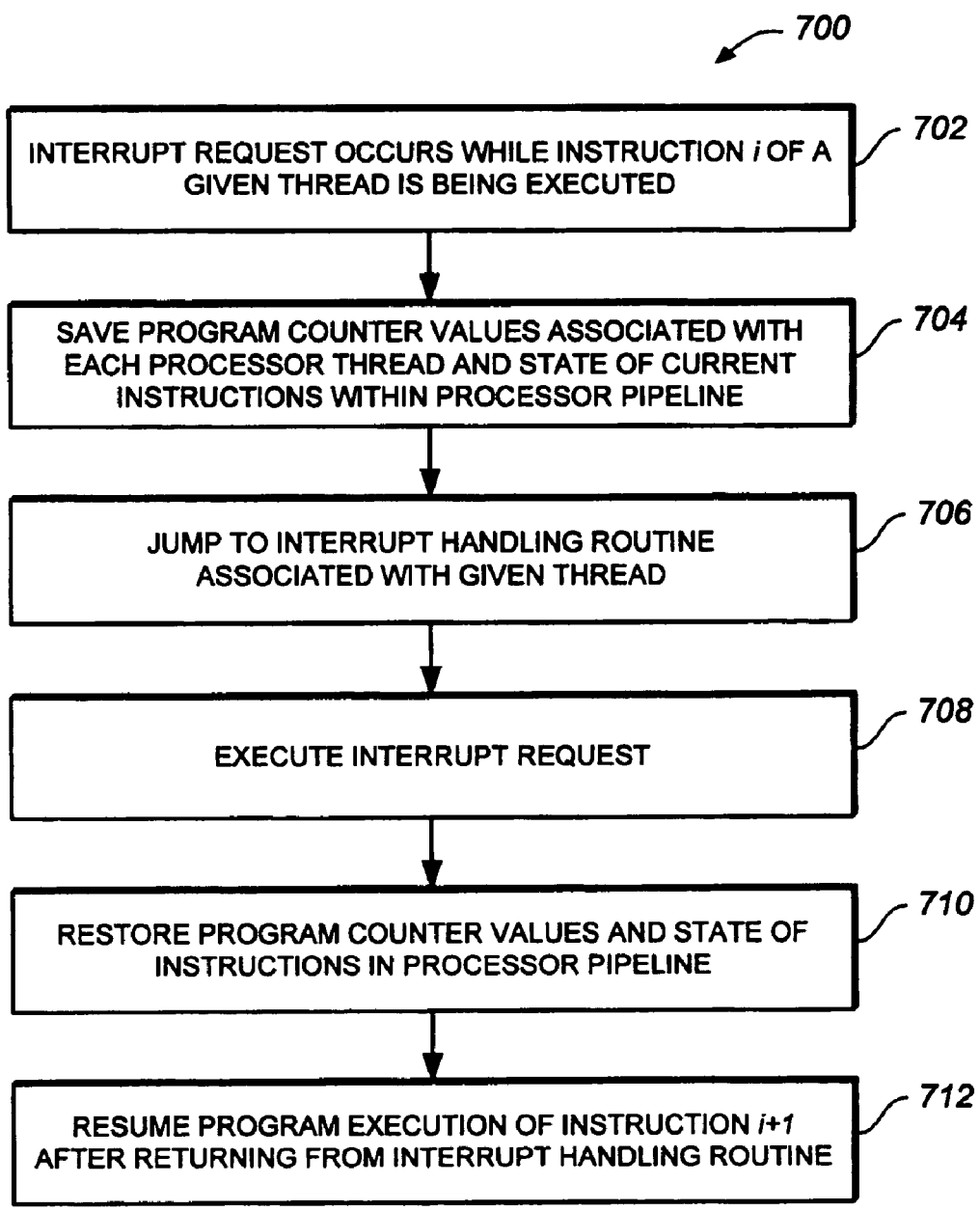
FIG._7

SYSTEM FOR DYNAMICALLY ALLOCATING PROCESSING TIME TO MULTIPLE THREADS

BACKGROUND

The following disclosure relates to processing circuits and systems.

Conventional operating systems typically support multi-tasking, which is a scheduling scheme that permits more than one processor thread to share common processing resources. A processor thread represents an architectural state within a processor that tracks execution of a software program. In the case of a computer having a single processor, only one processor thread is processed at any given point in time, meaning that the processor is actively executing instructions associated with a single processor thread. The act of re-assigning a processor from one processor thread to another is called a context switch.

In a conventional pipeline processor, a context switch typically occurs through a hardware interrupt and interrupt service routine. Interrupt service routines typically have an associated execution time, or interrupt overhead, that may consume valuable processor time. Additionally, in a conventional pipeline processor, a context switch typically occurs only at fixed intervals (e.g., every 100 µs), as determined by, e.g., vendors of an operating system.

SUMMARY

In general, in one aspect, this specification describes a processor including a pipeline stage. The pipeline stage includes a first input register, a second input register, a first output register, and a second output register. The processor further includes a first selector in communication with the first input register and the second input register, and a second selector in communication with the first output register and the second output register. The processor also includes a controller operable to control switching of the first and second selectors such that data associated with a first processor thread passes through the first input register, the pipeline stage, and the first output register during a time that the first processor thread is being processed, and data associated with a second processor thread passes through the second input register, the pipeline stage, and the second output register during a time that the second processor thread is being processed. The first input register and the first output register are operable to store a state of the first processor thread, and the second input register and the second output register are operable to store a state of the second processor thread.

Particular implementations can include one or more of the following features. The first selector can include a multiplexer and the second selector can include a de-multiplexer. The pipeline stage can include one of an instruction fetch unit, decode logic, issue logic, execution unit, read logic, or write logic. The controller can control switching of the first and second selectors based on input defining processor time to be allocated to each of the first and the second processor threads. The controller can control switching of the first and second selectors dynamically during execution of a program or statically based on a previously established processor time allocation for each of the first and second processor threads.

The processor can further include a first interrupt handling routine to handle an interrupt request associated with the first processor thread, and a second interrupt handling routine to handle an interrupt request associated with the second processor thread. The first interrupt handling routine and the second interrupt handling routine can have separate entry points. The processor can further include a first exception handling routine to handle an exception request associated with the first processor thread, and a second exception handling routine to handle an exception request associated with the second processor thread. The processor can further include a single exception handling routine or a single interrupt handling routine to respectively handle substantially all exception requests or substantially all interrupt requests associated with both the first and second processor threads.

The processor can further include a set of registers corresponding to each of a plurality of processor threads. Each register within a set can be located either before or after a pipeline stage of the processor. The controller can perform a context switch among the plurality of processor threads, including storing a state of a currently executing processor thread in a corresponding set of registers, and loading a state of another processor thread from a corresponding set of registers to allow for processing of the another processor thread.

In general, in another aspect, this specification describes a processor including a set of registers corresponding to each of a plurality of processor threads. Each register within a set is located either before or after a pipeline stage of the processor. The processor further includes a programmable controller operable to perform a context switch among the plurality of processor threads, including storing a state of a currently executing processor thread in a corresponding set of registers, and loading a state of another processor thread from a corresponding set of registers to allow for processing of the another processor thread.

Particular implementations can include one or more of the following features. The programmable controller can perform the context switch at an end of an instruction cycle. The processor can further include a register file having a plurality of banks corresponding to each of the plurality of processor threads. Each bank can store data associated with a corresponding processor thread. The processor can further include a plurality of program counters, each program counter operable to indicate an execution status of a corresponding processor thread. The processor can further include a plurality of interrupt handling routines corresponding to the plurality of processor threads, in which each interrupt handling routine handles an interrupt request associated with a corresponding processor thread. Each of the plurality of interrupt handling routines can have separate entry points. The processor can further include a plurality of exception handling routines corresponding to the plurality of processor threads, in which each exception handling routine handles an exception request associated with a corresponding processor thread. The processor can include a single exception handling routine or a single interrupt handling routine to respectively handle substantially all exception requests or substantially all interrupt requests associated with the plurality of processor threads.

In general, in another aspect, this specification describes a method including providing a first processor thread for instruction execution; providing a second processor thread for instruction execution; processing the first processor thread; and performing a context switch from the first processor thread to the second processor thread. Performing a context switch includes storing a state of the first processor thread in a first set of registers corresponding to the first processor thread, and loading a state of the second processor thread from a second set of registers corresponding to the second processor thread.

Particular implementations can include one or more of the following features. Storing a state of a given processor thread within a corresponding set of registers can include storing data corresponding to a pipeline stage of a processor. The method can further include receiving input changing the processor time allocation, and performing a context switch among the first and second processor threads based on the changed processor time allocation. Performing a context switch can include performing a context switch dynamically during execution of a program or statically based on a previously established processor time allocation for each of the first and second processor threads. The method can further include using a first interrupt handling routine to handle an interrupt request associated with the first processor thread, and using a second interrupt handling routine to handle an interrupt request associated with the second processor thread. The method can further include using a first exception handling routine to handle an exception request associated with the first processor thread, and using a second exception handling routine to handle an exception request associated with the second processor thread. The method can further include using a single exception handling routine or a single interrupt handling routine to respectively handle substantially all exception requests and substantially all interrupt requests associated with the first and second processor threads.

In general, in another aspect, this specification describes a processor including an instruction fetch unit operable to fetch instructions associated with a plurality of processor threads, a decoder responsive to the instruction fetch unit, issue logic responsive to the decoder, and a register file including a plurality of banks corresponding to the plurality of processor threads. Each bank is operable to only store data associated with a corresponding processor thread.

Particular implementations can include one or more of the following features. The data can include operands or results of executed instructions associated with a given processor thread. The processor can further include a controller in communication with the instruction fetch unit. The controller can determine a processor thread from which a next instruction will be fetched by the instruction fetch unit. The processor can further include a set of registers corresponding to each of the plurality of threads. Each register within a set can be located either before or after a pipeline stage of the processor. The controller can perform a context switch among the plurality of processor threads, including storing a state of a currently executing processor thread in a corresponding set of registers, and loading a state of another processor thread from a corresponding set of registers to allow for processing of the another processor thread. The controller can include a plurality of thread allocation counters corresponding to the plurality of processor threads. Each thread allocation counter can contain a value representing how much processor time is to be allocated for a respective processor thread. The controller can perform a context switch including switching a selector that is in communication with the instruction fetch unit. The selector can include a multiplexer or a de-multiplexer.

In general, in one aspect, this specification describes a processor including means for executing instructions through a pipeline stage. The means for executing instructions includes a first input means for storing data, a second input means for storing data, a first output means for storing data, and a second output means for storing data. The processor further includes a first means for selecting in communication with the first input means for storing data and the second input means for storing data, and a second means for selecting in communication with the first output means for storing data and the second output means for storing data. The processor also includes means for controlling switching of the first and second means for selecting such that data associated with a first processor thread passes through the first input means for storing data, the means for executing, and the first output means for storing data during a time that the first processor thread is being processed, and data associated with a second processor thread passes through the second input means for storing data, the means for executing, and the second output means for storing data during a time that the second processor thread is being processed. The first input means for storing data and the first output means for storing data are operable to store a state of the first processor thread, and the second input means for storing data and the second output means for storing data are operable to store a state of the second processor thread.

In general, in another aspect, this specification describes a processor including means for storing data corresponding to each of a plurality of processor threads. Each means for storing data is located either before or after a stage means of the processor. The processor further includes means for performing a context switch among the plurality of processor threads, including means for storing a state of a currently executing processor thread in a corresponding set of means for storing data, and loading a state of another processor thread from a corresponding set of means for storing data to allow for processing of the another processor thread.

In general, in another aspect, this specification describes a processor including means for fetching instructions associated with a plurality of processor threads, means for decoding the fetched instructions, means for issuing decoded instructions, and means for storing data associated with a corresponding processor thread within a corresponding means for storing.

Particular implementations can include one or more of the following features. The data can include operands or results of executed instructions associated with a given processor thread. The processor can further include means for determining a processor thread from which a next instruction will be fetched. The processor can further include means for storing data corresponding to each of the plurality of processor threads. Each means for storing data can be located either before or after a stage means of the processor. The processor can include means for performing a context switch among the plurality of processor threads, including means for storing a state of a currently executing processor thread in a corresponding means for storing data, and loading a state of another processor thread from a corresponding means for storing data to allow for processing of the another processor thread.

The means for performing a context switch can include means for storing a value representing how much processor time is to be allocated for a respective processor thread. The means for performing a context switch can include means for switching a selector that is in communication with the means for fetching.

Implementations can include one or more of the following advantages. A pipeline processor is provided that performs context switches without any interrupt overhead associated with hardware interrupts—e.g., an interrupt service routine. In one implementation, context switches occur automatically, and primarily through hardware, e.g., using a programmable thread allocation controller. In one implementation, a pipeline processor saves a state of a first processor thread to a first set of registers located between each pipeline stage of the pipeline processor, and loads a state of a second processor thread from a second set of registers also located between each pipeline stage of the pipeline processor. The location of the registers allow for fast context switching times.

Users, e.g., network administrators can customize how much processor time is allocated to each processor thread. In one implementation, after an initial processor time allocation has been established, users can further dynamically change the processor time allocation. Users can retain full control of processor time allotment rather than relinquishing the control to an operating system.

The details of one or more implementations are set forth in the accompanying drawings and the description below. Other features and advantages will be apparent from the description and drawings, and from the claims.

DESCRIPTION OF DRAWINGS

FIG. 1 is a block diagram of a pipeline processor architecture.

FIG. 2 is method of operation in the pipeline processor architecture of FIG. 1.

FIG. 3 is a block diagram of a pipeline processor in accordance with the pipeline processor architecture of FIG. 1.

FIG. 4 is a block diagram of a pipeline processor architecture.

FIG. 5 is a block diagram of a pipeline processor in accordance with the pipeline processor architecture of FIG. 4.

FIG. 6 is a method of performing exception handling in the pipeline processor architectures of FIGS. 1 and 4.

FIG. 7 is a method of performing interrupt handling in the pipeline processor architectures of FIGS. 1 and 4.

Like reference symbols in the various drawings indicate like elements.

DETAILED DESCRIPTION

FIG. 1 is a block diagram of a pipeline processor architecture 100 that is operable to process two or more processor threads T1, T2, . . . Tn. Processor threads T1, T2, . . . Tn each represent an architectural state within pipeline processor architecture 100 that tracks execution of corresponding software programs. Instructions for the software programs can be retrieved from, for example, an instruction cache (e.g., instruction cache 102). In one implementation, pipeline processor architecture 100 includes two or more program counters (not shown) each of which corresponds to a processor thread T1, T2, . . . Tn. Each program counter indicates where (for a corresponding processor thread T1, T2, . . . Tn) pipeline processor architecture 100 is with respect to an instruction sequence. Program counters are discussed in greater detail below in association with FIGS. 3 and 5.

In one implementation, pipeline processor architecture 100 includes six pipeline stages. The six pipeline stages include an instruction fetch stage (IF), an instruction decode stage (ID), an instruction issue stage (IS), an instruction execution stage (EX), a data memory read stage (MEM), and write back stage (WB). Pipeline processor architecture 100, however, can include a different number of pipeline stages. Pipeline processor architecture 100 further includes an instruction fetch unit (IFU) 104, decode logic 106, issue logic 108, a register file 110, an execution unit 112, read logic 114, write logic 116, and a programmable thread allocation controller 118.

Instruction fetch unit 104 retrieves program instructions from, e.g., instruction cache 102. Decode logic 106 decodes the program instructions and generates decoded instructions to be executed by execution unit 112. In one implementation, the decoded instructions are fixed length micro-op instructions. Issue logic 108 issues decoded instructions to execution unit 112 for execution. Execution unit 112 can be a load execution unit, store execution unit, arithmetic logic unit (ALU), multiply and accumulate (MAC) unit, or a composite load/store execution unit as described in U.S. patent application entitled—"Variable Length Pipeline Processor Architecture" by Hong-yi Chen and Jensen Tjeng, (U.S. patent application Ser. No. 11/070,780), which is incorporated by reference in its entirety. Read logic 114 reads data from, e.g., a data cache (not shown). Write logic 116 writes results of executed instructions back to, e.g., a data cache, register file 110, or a re-order buffer (not shown).

Register file 110 stores data associated with each processor thread T1, T2, . . . Tn. In one implementation, register file 110 includes separate banks (e.g., banks T1, T2, . . . Tn) that store data associated with a corresponding processor thread T1, T2, . . . Tn. For example, if write logic 116 is writing data associated with processor thread T2 back to register file 110, then write logic 116 writes the data to bank T2 of register file 110. Alternatively, a separate register file (not shown) for storing data corresponding to each processor thread T1, T2, . . . Tn can be implemented within pipeline processor architecture 100.

Programmable thread allocation controller 118 can be programmed to store processor time allocations that have been defined for each processor thread T1, T2, . . . Tn—i.e., what portion of processor time will be dedicated to each processor thread T1, T2, . . . Tn. In one implementation, input, e.g., from a user, defining portions of processor time to be allocated to each of a plurality of processor threads (e.g., processor threads T1, T2, . . . Tn) is received through a graphical user interface (not shown). For example, a user can allocate 95% of processor time to a first processor thread and 5% to a second processor thread for a dual thread pipeline processor. In one implementation, the processor time allocation defined for each processor thread (e.g., processor threads T1, T2, . . . Tn) can be dynamically changed—i.e., changed during program execution—by a user or preferably by a software program (e.g., a software program to be executed). Alternatively, the processor time allocation for each processor thread can be statically set—i.e., not changeable during program execution.

In one implementation, programmable thread allocation controller 118 performs a context switch automatically by determining a processor thread from which a next instruction will be fetched (e.g., by instruction fetch unit 104). In one implementation, programmable thread allocation controller 118 performs a context switch by switching one or more selectors, e.g., multiplexers and/or de-multiplexers (not shown) that are in communication with instruction fetch unit 104. One implementation of a processor including multiplexers and de-multiplexers that performs context switches is discussed below in association with FIGS. 3, 4, and 5. When a context switch occurs, an instruction associated with a next processor thread is fetched by instruction fetch unit 104. Though the pipeline stages (e.g., pipeline stages IF, ID, IS, EX, MEM, WB) of pipeline processor architecture 100 may contain instructions associated with two or more processor threads, data associated with each given processor thread is maintained separately through register file 110, thus, the integrity of data associated with each processor thread is maintained. Unlike a conventional pipeline processor that may require an interrupt service routine, programmable thread allocation controller 118 does not have any interrupt overhead associated with performing a context switch.

FIG. 2 shows a method 200 for processing processor threads through a pipeline processor architecture (e.g., pipeline processor architecture 100). Input defining a portion of processor time to be allocated to each of a plurality of processor threads is received (step 202). In one implementation, input allocations are received from a user through a graphical user interface. The processor time allocated to each processor thread can be stored in a programmable thread allocation controller (e.g., programmable thread allocation controller 118). In one implementation, processor time is allocated based on CPU (Central Processing Unit) cycles, clock cycles and/or instruction cycles.

Each thread is processed by the pipeline processor according to the processor time allocated to each thread (step 204). In one implementation, a context switch occurs automatically according to the processor time allocated to each thread as stored in the programmable thread allocation controller. In one implementation, a programmable thread allocation controller controls switching of one or more multiplexers and/or de-multiplexers that are in communication with an instruction fetch unit (e.g., instruction fetch unit 104). In one implementation, a programmable thread allocation controller controls switching of one or more multiplexers and/or de-multiplexers located before and after each pipeline stage of the pipeline processor to perform a context switch, as discussed in greater detail below. In this implementation, a state of a processor thread is stored in, and loaded from, registers that are located before and after each pipeline stage in the pipeline processor. In one implementation, context switches occur at the end of a given instruction cycle.

A determination is made (e.g., through programmable thread allocation controller 118) whether input dynamically changing the processor time allocation is received (step 206). If the processor time allocated to each processor thread has not been dynamically changed, then each processor thread is processed according to the processor time allocation as previously established, and method 200 returns to step 204. If the processor time allocation has been dynamically changed, then each processor thread is processed according to the changed processor time allocation (step 208). After step 208, method 200 returns to step 206, discussed above.

FIG. 3 illustrates a block diagram of a pipeline processor 300 built in accordance with pipeline processor architecture 100 that processes (n) processor threads T1, T2, ... Tn. In one implementation, pipeline processor 300 includes an instruction fetch unit 304, a decoder 306, a register file 308, issue logic 310, a two-stage execution unit 312, a re-order buffer 314, and a programmable thread allocation controller 316. Pipeline processor 300 further includes registers T1-Tn and program counters T1-Tn that respectively correspond to processor threads T1, T2, ... Tn. Pipeline processor 300 further includes multiplexer 350.

In one implementation, during an instruction fetch (IF) stage, instruction fetch unit 304 retrieves an instruction to be executed from, for example, instruction cache 302. Instruction fetch unit 304 retrieves instructions in accordance with program counters T1, T2, ... Tn. In one implementation, program counter T1 indicates an execution status of processor thread T1 (i.e., where pipeline processor 300 is with respect to an instruction sequence associated with processor thread T1), program counter T2 indicates an execution status associated with processor thread T2, and program counter Tn indicates an execution status associated with processor thread Tn.

During an instruction decode stage (ID), instructions retrieved by instruction fetch unit 304 are decoded.

During an instruction issue stage (IS), in one implementation, the decoded instructions are sent to re-order buffer 314 (through issue logic 310). Re-order buffer 314 stores the decoded instructions until the decoded instructions are issued for execution. In one implementation, re-order buffer 314 is a circular buffer.

Re-order buffer 314 also stores the results of executed instructions until the executed instructions are ready for retirement, e.g., into register file 308. In one implementation, register file 308 includes banks (e.g., banks T1, T2, ... Tn) that correspond to each processor thread (e.g., processor threads T1, T2, ... Tn) processed by processor 300. Bank T1 holds data associated with processor thread T1, bank T2 holds data associated with processor thread T2, and bank Tn holds data associated with processor thread Tn. The data can include operands and/or results of executed instructions associated with a given processor thread. In one implementation, pipeline processor 300 does not include a re-order buffer 314.

During executions stages EX1, EX2, execution unit 312 executes the decoded instructions issued from issue logic 310. Execution unit 312 can be any type of execution unit, as discussed above. Though execution unit 312 is shown as having two pipeline stages, execution unit 312 can have a different number of pipeline stages. In one implementation, results of the executed instructions are written back to re-order buffer 314, and then retired to register file 308.

Programmable thread allocation controller 316 is operable to be programmed to store processor time allocation for each processor thread T1, T2, ... Tn—i.e., how much processor time will be dedicated to each processor thread T1, T2, ... Tn. In one implementation, input, e.g., from a user, allocating portions of processor time to each processor thread T1, T2, ... Tn is received through a graphical user interface (not shown). In one implementation, the processor time allocation for each processor thread T1, T2, ... Tn can be dynamically changed by a user. In one implementation, the processor time allocation for each processor thread T1, T2, ... Tn is changed dynamically through a software application being processed by processor 300.

In one implementation, programmable thread allocation controller 316 automatically performs a context switch between processor threads T1, T2, ... Tn by switching multiplexer 350 that is in communication with instruction fetch unit 304. For example, during a time that pipeline processor 300 is processing processor thread T1, multiplexer 350 is controlled to pass instructions associated with processor thread T1 through the pipeline stages of pipeline processor 300. When a context switch occurs from processor thread T1, multiplexer 350 is controlled to pass instructions associated with another processor thread, e.g., processor thread T2. In one implementation, multiplexer 350 is an n-to-1 multiplexer.

In one implementation, programmable thread allocation controller 316 includes a plurality of thread allocation counters (e.g., thread allocation counters T1-Tn) that determine a weighting that corresponds to processor time allocated to each processor thread. For example, in one implementation, each of thread allocation counters T1-Tn contains a value that represents how many CPU cycles are allocated for each thread. For example, if thread allocation counter T1 contains a value of 256, thread allocation counter T2 contains a value of 16, and thread allocation counter Tn contains a zero value, then instructions will be first fetched from processor thread T1 for 256 CPU cycles, then instructions will be fetched from processor thread T2 for 16 CPU cycles, and zero instructions will be fetched from processor thread Tn. Instructions are then fetched from processor threads T1 and T2 again for another 256 CPU cycles and 16 CPU cycles, respectively, and so on. The instruction fetching can continue accordingly until the values within one or more of the thread allocation counters are changed. As each thread allocation counter T1-Tn reaches a zero value, then programmable thread allocation counter 316 switches multiplexer 350 to pass instructions associated with a next processor thread to instruction fetch unit 304 for processing.

FIG. 4 is a block diagram of a pipeline processor architecture 400 that is operable to process two or more processor threads T1, T2, ... Tn. Instructions associated with processor threads T1, T2, ... Tn can be retrieved from, for example, an instruction cache (e.g., instruction cache 402).

In one implementation, pipeline processor architecture 400 includes six pipeline stages. The six pipeline stages include an instruction fetch stage (IF), an instruction decode stage (ID), an instruction issue stage (IS), an instruction execution stage (EX), a data memory read stage (MEM), and write back stage (WB). Pipeline processor architecture 400, however, can include a different number of pipeline stages. Pipeline processor architecture 400 further includes an instruction fetch unit (IFU) 404, decode logic 406, issue logic 408, an execution unit 410, read logic 412, write logic 414, and a programmable thread allocation controller 416. Pipeline processor architecture 400 is similar to pipeline processor architecture of FIG. 1, however, pipeline processor architecture 400 further includes a set registers (e.g., registers A1-A7, B1-B7, N1-N7) located between each pipeline stage (one before and after each stage) for storing a state of a corresponding processor thread T1, T2, ... Tn during a context switch.

Registers A1-A7 store a state of processor thread T1. In a like manner, registers B1-B7 store a state of processor thread T2, and registers N1-N7 store a state of processor thread Tn. In one implementation, each register A1-A7, B1-B7, N1-N7 stores a state of a corresponding processor thread including storing a state of data produced by a corresponding pipeline stage of pipeline processor architecture 400 at the end of given instruction cycle. For example, when processing instructions associated with processor thread T1, at the end of an instruction cycle register A3 can store a state of data for processor thread T1 received from decode logic 406, and register A5 can store a state of data received from execution unit 410. Registers A1-A7, B1-B7, N1-N7 facilitate context switches in that they permit a state of a corresponding processor thread to be directly loaded from (or stored to) a given register. In one implementation, each set of registers A1-A7, B1-B7, N1-N7 is located relatively close to a functional unit within pipeline processor architecture 400 (e.g., between each pipeline stage) and permits fast context switching times.

In one implementation, programmable thread allocation controller 416 performs a context switch automatically by switching one or more multiplexers and/or de-multiplexers (not shown) located before or after each pipeline stage (e.g., pipeline stages IF, ID, IS, EX, MEM, WB). One implementation of a processor including multiplexers and de-multiplexers that performs context switches is discussed below in association with FIG. 5. When a context switch occurs, one set of registers (e.g., registers A1-A7) associated with a current processor thread (e.g., processor thread T1) from which the context switch is to occur stores a state of the current processor thread. To complete the context switch, a state of a next processor thread (e.g., processor thread T2) is loaded from a different set of registers (e.g., registers B1-B7) associated with the next processor thread. The pipeline processor processes the next processor thread in the following instruction cycle. In one implementation, context switches occur at the end of an instruction cycle (i.e., after data from a pipeline stage has been saved to an associated register) to permit seamless context switches.

FIG. 5 illustrates a block diagram of a pipeline processor 500 built in accordance with pipeline processor architecture 400 that processes two threads T1, T2. In one implementation, pipeline processor 500 includes an instruction fetch unit 504, a decoder 506, a register file 508, issue logic 510, a two-stage execution unit 512, a re-order buffer 514, and a programmable thread allocation controller 516. Pipeline processor 500 further includes a first set of registers A1-A6 that corresponds to processor thread T1, and a second set of registers B1-B6 that corresponds to processor thread T2. Pipeline processor 500 further includes program counters T1, T2, multiplexers 550, and de-multiplexers 552.

In one implementation, during an instruction fetch (IF) stage, instruction fetch unit 504 retrieves an instruction to be executed from, for example, instruction cache 502. Instruction fetch unit 504 retrieves instructions in accordance with program counters T1, T2. In one implementation, program counter T1 indicates an execution status of processor thread T1 (i.e., where pipeline processor 500 is with respect to an instruction sequence associated with processor thread T1), and program counter T2 indicates an execution status associated with processor thread T2.

During an instruction decode stage (ID), instructions retrieved by instruction fetch unit 504 are decoded.

During an instruction issue stage (IS), in one implementation, the decoded instructions are sent to re-order buffer 514 (through issue logic 510). Re-order buffer 514 stores the decoded instructions until the decoded instructions are issued for execution. In one implementation, re-order buffer 514 is a circular buffer.

Re-order buffer 514 also stores the results of executed instructions until the executed instructions are ready for retirement, e.g., into register file 508. In one implementation, register file 508 includes two banks T1, T2. Bank T1 holds data associated with processor thread T1, and bank T2 holds data associated with processor thread T2. Register file 508 can include a thread index (not shown) that indicates registers from which data will be loaded. The thread index ensures that data from a register associated with a currently executing processor thread will be loaded into register file 508.

During executions stages EX1, EX2, execution unit 512 executes the decoded instructions issued from issue logic 510. Execution unit 512 can be any type of execution unit, as discussed above. Though execution unit 512 is shown as having two pipeline stages, execution unit 512 can have a different number of pipeline stages. In one implementation, results of the executed instructions are written back to re-order buffer 514, and then retired to register file 508.

Programmable thread allocation controller 516 is operable to be programmed to store processor time allocation for each processor thread T1, T2. In one implementation, programmable thread allocation controller 516 automatically performs a context switch between processor threads T1, T2 by switching multiplexers 550 and de-multiplexers 552 located respectively before and after each pipeline stage (e.g., pipeline stages IF, ID, IS, EX1, EX2) of pipeline processor 500. For example, during a time that pipeline processor 500 is processing processor thread T1, multiplexers 550 and de-multiplexers 552 are controlled to pass instructions associated with processor thread T1 (through the pipeline stages of pipeline processor 500). State information for processor thread T2 is stored in registers B1-B6. When a context switch occurs from processor thread T1, registers A1-A6 store a state of processor thread T1, and a state of processor thread T2 is loaded from registers B1-B6 (through multiplexers 550 and de-multiplexers 552) and processed by pipeline processor 500. In one implementation, each of multiplexers 550 is a 2-to-1 multiplexer, and each of de-multiplexers 552 is a 1-to-2 de-multiplexer.

Exception Handling

When a processor (e.g., processors 300, 500) built in accordance with pipeline processor architectures 100, 400 detects an exception, the normal sequence of instruction execution is suspended. An exception is an event that causes suspension of normal program execution. Types of exceptions include, for example, addressing exceptions, data exceptions, operation exceptions, overflow exceptions, protection exceptions, underflow exceptions, and so on. An exception may be generated by hardware or software.

FIG. 6 illustrates a method for performing exception handling in a processor implemented according to pipeline processor architectures 100, 400. An exception request occurs while instruction i of a given thread is being executed (step 602). Program counter values associated with each processor thread are saved, along with a state of current instructions within the pipeline of the processor (step 604). In one implementation, all instructions within the pipeline of the processor are aborted, or flushed. The processor jumps to an exception handling routine associated with a given thread (step 606). In one implementation, each processor thread has an associated exception handling routine that is separate and independent from exception handling routines associated with other processor threads. In one implementation, a single exception handling routine performs exception requests for substantially all processor threads.

The exception request is executed by a given exception handling routine (step 608). After the exception request has been performed by the processor, program counter values are restored within program counters of the processor, and a state of instructions (prior to the exception request) is restored within the pipeline of the processor (step 610). The processor resumes program execution of the next instruction (e.g., instruction i+1) after returning from an exception handling routine (step 612). In step 612, the processor can resume program instruction at instruction i if the instruction is to be re-executed.

Interrupt Handling

Interrupts within a processor implemented according to pipeline processor architectures 100, 400 are handled similarly to exceptions. FIG. 7 illustrates a method for handling interrupts in a processor implemented according to pipeline processor architectures 100, 400.

An interrupt occurs while instruction i of a given thread is being executed (step 702). Program counter values associated with each processor thread are saved, along with a state of current instructions within the pipeline of the processor (step 704). The processor jumps to an interrupt handling routine associated with a given thread (step 706). In one implementation, each processor thread has an associated interrupt handling routine having an entry point that is separate and independent from entry points associated with interrupt handling routines associated with other processor threads. An entry point is a starting address of an interrupt handling routine. In one implementation, a single interrupt handling routine (with a single entry point) performs interrupts for substantially all processor threads.

The interrupt is executed by a given interrupt handling routine (step 708). After the interrupt has been performed by the processor, program counter values are restored within program counters of the processor, and a state of instructions (prior to the interrupt request) is restored within the pipeline of the processor (step 710). The processor resumes program execution of the next instruction (e.g., instruction i+1) after returning from an interrupt handling routine (step 712).

A pipeline processor built in accordance with pipeline processor architectures 100, 400 can be used in a wide range of applications. Example applications include data storage applications, wireless applications, and computer system applications.

A number of implementations have been described. Nevertheless, it will be understood that various modifications may be made without departing from the spirit and scope of the invention. For example, the steps of the methods described above can be performed in a different order and still achieve desirable results. Accordingly, other implementations are within the scope of the following claims.

What is claimed is:

1. A processor, comprising:
   a pipeline comprising multiple pipeline stages including an instruction fetch unit operable to fetch instructions associated with a plurality of processor threads, including a first processor thread and a second processor thread;
   a set of registers corresponding to each of the plurality of processor threads, including the first processor thread and the second processor thread, the registers being located before and after each pipeline stage in the multiple pipeline stages of the pipeline of the processor;
   wherein each pipeline stage includes a first selector in communication with input registers for that pipeline stage, and a second selector in communication with output registers for that pipeline stage, the input registers and the output registers being from the set of registers; and
   a programmable controller operable to perform a context switch among the plurality of processor threads, including storing a state of a currently executing processor thread in a corresponding set of registers and loading a state of another processor thread from a corresponding set of registers to allow for processing of the another processor thread, by controlling switching of the first and second selectors such that data associated with the first processor thread pass through the corresponding first set of registers, and the multiple pipeline stages, during a time that the first processor thread is being processed, and data associated with the second processor thread pass through the corresponding second set of registers, and the multiple pipeline stages, during a time that the second processor thread is being processed, wherein the controller includes a plurality of hardware thread allocation counters corresponding to the plurality of processor threads to effect the context switch by the programmable controller within the processor, each thread allocation counter containing a first value representing a respective processor time allocation that controls a period of processor time that is to be dedicated to a respective processor thread, wherein the respective processor time allocation is fixed for and determined prior to the period of processor time, wherein the respective processor thread fully and exclusively uses the respective processor time allocation,
   wherein the programmable controller is configured to dynamically change subsequent processor time allocations to the plurality of processor threads by changing one or more of the first values of the thread allocation counters to one or more second values based on a received input, the received input defining one or more portions of processor time to be allocated to each of the plurality of processor threads.

2. The processor of claim 1, wherein the first selector includes a multiplexer and the second selector includes a de-multiplexer.

3. The processor of claim 1, wherein the multiple pipeline stages further include one of decode logic, issue logic, execution unit, read logic, or write logic.

4. The processor of claim 1, wherein the controller controls switching of the first and second selectors based on input defining processor time to be allocated to each of the first processor thread and the second processor thread.

5. The processor of claim 4, wherein the controller is operable to control switching of the first and second selectors dynamically during execution of a program.

6. The processor of claim 1, further comprising:
a first interrupt handling routine to handle an interrupt request associated with the first processor thread; and
a second interrupt handling routine to handle an interrupt request associated with the second processor thread.

7. The processor of claim 6, wherein the first interrupt handling routine and the second interrupt handling routine have separate entry points.

8. The processor of claim 1, further comprising:
a first exception handling routine to handle an exception request associated with the first processor thread; and
a second exception handling routine to handle an exception request associated with the second processor thread.

9. The processor of claim 1, further comprising a single exception handling routine or a single interrupt handling routine to respectively handle substantially all exception requests or substantially all interrupt requests associated with both the first processor thread and the second processor thread.

10. A processor, comprising:
a pipeline comprising multiple pipeline stages;
a set of registers corresponding to each of a plurality of processor threads, the registers within a set being located before and after each of the multiple pipeline stages of the processor;
a programmable controller operable to perform a context switch among the plurality of processor threads, including storing a state of a currently executing processor thread in a corresponding set of registers, and loading a state of another processor thread from a corresponding set of registers to allow for processing of the another processor thread, wherein the controller includes a plurality of thread allocation counters corresponding to the plurality of processor threads to effect the context switch by the programmable controller within the processor, each thread allocation counter containing a value representing a respective processor time allocation that controls a period of processor time that is to be dedicated to a respective processor thread, wherein the respective processor time allocation is fixed for and determined prior to the period of processor time, wherein the respective processor thread fully and exclusively uses the respective processor time allocation; and
circuitry configured to cause, based on an exception, a jump to one of a plurality of exception handling routines corresponding to the plurality of processor threads, wherein each of the plurality of exception handling routines handles an exception request associated with a corresponding processor thread.

11. The processor of claim 10, wherein the programmable controller is operable to perform the context switch at an end of an instruction cycle.

12. The processor of claim 10, further comprising a register file including a plurality of banks corresponding to each of the plurality of processor threads, each bank operable to store data associated with a corresponding processor thread.

13. The processor of claim 10, further comprising a plurality of program counters, each program counter operable to indicate an execution status of a corresponding processor thread.

14. The processor of claim 10, further comprising a plurality of interrupt handling routines corresponding to the plurality of processor threads, wherein each interrupt handling routine handles an interrupt request associated with a corresponding processor thread.

15. The processor of claim 14, wherein each of the plurality of interrupt handling routines have separate entry points.

16. A method comprising:
providing a first processor thread for instruction execution;
providing a second processor thread for instruction execution;
processing, on a processor, the first processor thread;
performing, on the processor, a context switch from the first processor thread to the second processor thread, wherein the performing comprises (a) storing a state of the first processor thread in a first set of registers corresponding to the first processor thread, the first set of registers comprising first registers located before and after each pipeline stage in multiple pipeline stages of a pipeline of the processor; and (b) loading a state of the second processor thread from a second set of registers corresponding to the second processor thread, the second set of registers comprising second registers located before and after each pipeline stage in the multiple pipeline stages of the pipeline of the processor, wherein the performing comprises performing the context switch in accordance with signals from a programmable controller including at least first and second thread allocation counters corresponding to the first and second processor threads to effect the context switch by the programmable controller within the processor, each thread allocation counter containing a value representing how much processor time is to be allocated for a respective processor thread, wherein the programmable controller is operable to dynamically change processor time allocations to the first processor thread and the second processor thread;
using, on the processor, the first thread allocation counter to determine a weighting that corresponds to a first processor time allocation that controls a first period of processor time that is to be allocated to the first processor thread, wherein the first processor time allocation is fixed for and determined prior to the first period of processor time, wherein the first processor thread fully and exclusively uses the first processor time allocation; and
using, on the processor, the second thread allocation counter to determine a weighting that corresponds to a second processor time allocation that controls a second period of processor time that is to be allocated to the second processor thread, wherein the second processor time allocation is fixed for and determined prior to the second period of processor time, wherein the second processor thread fully and exclusively uses the second processor time allocation.

17. The method of claim 16, wherein storing a state of a given processor thread within a corresponding set of registers includes storing data corresponding to a pipeline stage of a processor.

18. The method of claim 16, further comprising:
receiving input changing a processor time allocation; and
performing a context switch among the first and second processor threads based on the changed processor time allocation.

19. The method of claim 16, wherein performing a context switch includes performing a context switch dynamically during execution of a program.

20. The method of claim 16, further comprising:
using a first interrupt handling routine to handle an interrupt request associated with the first processor thread; and using a second interrupt handling routine to handle an interrupt request associated with the second processor thread.

21. The method of claim 20, wherein the first interrupt handling routine and the second interrupt handling routine have separate entry points.

22. The method of claim 16, further comprising:
using a first exception handling routine to handle an exception request associated with the first processor thread; and
using a second exception handling routine to handle an exception request associated with the second processor thread.

23. The method of claim 16, further comprising using a single exception handling routine or a single interrupt handling routine to respectively handle substantially all exception requests and substantially all interrupt requests associated with the first processor thread and the second processor thread.

24. A processor comprising:
a pipeline comprising multiple pipeline stages including (a) an instruction fetch unit operable to fetch instructions associated with a plurality of processor threads, (b) a decoder responsive to the instruction fetch unit, (c) issue logic responsive to the decoder, and (d) an execution unit in communication with the issue logic;
a set of registers corresponding to each of the plurality of processor threads, including the first processor thread and the second processor thread, the registers being located before and after each pipeline stage in the multiple pipeline stages of the pipeline of the processor;
a register file including a plurality of banks corresponding to the plurality of processor threads, each bank operable to only store data associated with a corresponding processor thread, wherein the execution unit is communicatively coupled with each of the banks; and
a programmable controller in communication with the instruction fetch unit, the controller operable to determine a processor thread from which a next instruction will be fetched by the instruction fetch unit, wherein the controller includes a plurality of thread allocation counters corresponding to the plurality of processor threads to effect the context switch by the programmable controller within the processor, each thread allocation counter containing a value representing a respective processor time allocation that controls a period of processor time that is to be dedicated to a respective processor thread by the instruction fetch unit, wherein the respective processor time allocation is fixed for and determined prior to the period of processor time, and wherein the respective processor thread fully and exclusively uses the respective processor time allocation.

25. The processor of claim 24, wherein the data includes operands or results of executed instructions associated with a given processor thread.

26. The processor of claim 24, wherein the controller is operable to perform a context switch among the plurality of processor threads, including storing a state of a currently executing processor thread in a corresponding set of registers, and loading a state of another processor thread from a corresponding set of registers to allow for processing of the another processor thread.

27. The processor of claim 24, wherein the controller is operable to perform a context switch including switching a selector that is in communication with the instruction fetch unit.

28. The processor of claim 27, wherein the selector includes a multiplexer or a de-multiplexer.

29. The processor of claim 27, wherein the controller is operable to control switching of the selector dynamically during execution of a program.

30. The processor of claim 27, wherein the controller is operable to control switching of the selector statically based on a pre-determined processor time allocation for each of the plurality of processor threads.

31. The processor of claim 24, wherein each of the plurality of processor threads has an associated exception handling routine for handling exceptions that is separate and independent from exception handling routines associated with other processor threads.

32. The processor of claim 24, wherein each of the plurality of processor threads has an associated interrupt handling routine for handling interrupts that is separate and independent from interrupt handling routines associated with other processor threads.

33. The processor of claim 32, wherein each of the plurality of interrupt handling routines has a separate entry point.

34. The processor of claim 1, wherein the first value controls how many instructions are to be fetched at a time for the respective processor thread by the instruction fetch unit.

* * * * *